United States Patent
Miller et al.

[11] Patent Number: 6,018,141
[45] Date of Patent: Jan. 25, 2000

[54] METHOD FOR HEATING A TOOLING DIE

[75] Inventors: Charles G. Miller, Branford, Conn.; John A. Rolls, Armonk, N.Y.; Otis H. Hastings, Mahwah, N.J.

[73] Assignee: Thermion Systems International, Stratford, Conn.

[21] Appl. No.: 08/635,140

[22] Filed: Apr. 19, 1996

[51] Int. Cl.[7] .................................................. H05B 1/00
[52] U.S. Cl. ........................................ 219/221; 219/227
[58] Field of Search ................................... 219/213, 221, 219/543–544, 528–529, 548–549, 243; 338/255–257, 262, 292, 308; 425/DIG. 13

[56] References Cited

U.S. PATENT DOCUMENTS

| | | | |
|---|---|---|---|
| 2,747,646 | 5/1956 | Lippman | 219/767 |
| 3,387,333 | 6/1968 | Irvine et al. | 425/404 |
| 3,657,516 | 4/1972 | Fujihara . | |
| 3,697,728 | 10/1972 | Stirzenbecher | 219/548 |
| 3,748,866 | 7/1973 | Heider et al. | 62/99 |
| 3,859,504 | 1/1975 | Motokawa et al. . | |
| 3,940,221 | 2/1976 | Nissel | 425/141 |
| 4,021,281 | 5/1977 | Pall | 156/167 |
| 4,039,720 | 8/1977 | Cherenko et al. . | |
| 4,110,151 | 8/1978 | Morse . | |
| 4,245,149 | 1/1981 | Fairlie . | |
| 4,250,397 | 2/1981 | Grey et al. . | |
| 4,282,049 | 8/1981 | Morse . | |
| 4,459,250 | 7/1984 | Miura et al. | 264/415 |
| 4,534,886 | 8/1985 | Kraus et al. . | |
| 4,734,231 | 3/1988 | Morita et al. . | |
| 4,737,618 | 4/1988 | Barbier et al. . | |
| 4,942,078 | 7/1990 | Newman et al. . | |
| 4,972,197 | 11/1990 | McCauley et al. | 343/704 |
| 4,978,484 | 12/1990 | Takashige et al. | 264/40.1 |
| 5,007,818 | 4/1991 | Barancik et al. | 425/144 |
| 5,205,210 | 4/1993 | Mathis | 101/32 |
| 5,250,228 | 10/1993 | Bairgrie et al. . | |
| 5,344,696 | 9/1994 | Hastings et al. . | |
| 5,361,183 | 11/1994 | Wiese . | |

FOREIGN PATENT DOCUMENTS

| | | |
|---|---|---|
| 38922 | 11/1981 | European Pat. Off. . |
| 496388 | 7/1992 | European Pat. Off. . |
| 2493090 | 4/1982 | France . |
| 2691400 | 11/1993 | France . |
| 4221455 | 1/1994 | Germany . |
| 55-166892 | 12/1980 | Japan . |
| 6-297632 | 10/1994 | Japan . |
| 7-302683 | 11/1995 | Japan . |
| 1460449 | 1/1977 | United Kingdom . |
| 9515670 | 6/1995 | WIPO . |

*Primary Examiner*—Teresa Walberg
*Assistant Examiner*—Vinod D Patel
*Attorney, Agent, or Firm*—White & Case LLP

[57] ABSTRACT

A method is provided for heating the surface of a tooling die. In the method, a heater element consisting of a fabric layer composed of conductive fibers is incorporated into the surface of a tooling die or mold. The heater element is attached to a power source, which energizes the element at prescribed intervals and temperatures to heat the surface of the tooling die.

2 Claims, 3 Drawing Sheets

METHOD FOR HEATING A TOOLING DIE

BACKGROUND OF THE INVENTION

1. Field of the Invention

The present invention relates generally to methods of heating tooling dies. Specifically, the invention relates to a method of heating a tooling die by utilizing a heater element such as, a laminated composite heater element.

2. Description of the Prior Art

The effective use of tooling dies requires that they be maintained at a constant temperature. During idle periods the die will cool. When the manufacturing resumes, the first few items are typically wasted because the tooling die does not adequately reach operating temperature until several cycles are performed. Maintaining the temperature of the tooling die during the idle times can increase production by eliminating the start/restart waste. Thus, it would be desirable to provide a method for maintaining the surface temperature of a tooling die.

A variety of elements for heating surfaces exist in the prior art. U.S. Pat. No. 4,534,886, to Kraus et al., discloses an electrically conductive web comprising a non-woven sheet of conductive fibers and non-conductive fibers. The sheet is saturated with a dispersion containing conductive particles and is then dried. The Kraus et al. heater element is primarily used in heating pads.

International Application No. PCT/US94/13504 (Publication No. WO95/15670), discloses an electrically conductive composite heating assembly that has an electrically conductive non-woven fiber layer laminated between layers of fiberglass and other dielectric material and has an abrasion resistant outer layer. The heater element is used in an ice protection system to withstand repeated mechanical stress and thermal cycles in extremely harsh aerospace applications.

U.S. Pat. No. 5,344,696 to Hastings et al. discloses an integrally bonded laminate which is used to thermally control a surface or portion of a surface of an aircraft to which the laminate is bonded.

However, none of the prior art heater elements have been successfully applied to tooling dies.

SUMMARY OF THE INVENTION

The present invention comprises a method for heating the surface of a tooling die. The method comprises providing a heater element, disposing the heater element on the surface of the tooling die and energizing the element at prescribed intervals and temperatures which are effective to heat surface of the die.

DETAILED DESCRIPTION OF THE PREFERRED EMBODIMENT

In the preferred embodiment, the heater element of the present invention is a laminated composite, impermeable to water, and is of the type disclosed in U.S. Pat. No. 5,344,696 (Hastings et al.), which is incorporated herein by reference.

As disclosed in the Hastings et al. patent, the heater element comprises a durable outer ply, which is resistant to abrasion and impermeable to water, bonded to and through a conductive layer of fibers, and an integrally enveloping adhesive, which is adhered to the surface of a vessel. The conductive layer is connected to a source of electrical energy, and control means are adapted to control the temperature of the surface of the vessel. This laminated structure is considered preferable; however, it is contemplated that other structures may be used. For example, the heater element need not be a laminated structure. Rather, the heater element may comprise merely a layer of conductive fibers. This structure of the heater element is particularly useful if the material into which the heater element is embedded has dielectric properties that will evenly distribute the heat generated by the element.

In one embodiment of the invention, the preferred heater element is manufactured under the trademark Thermion™ by Aerospace Safety Technologies, Inc. Thermion™ is light, flexible and may be translucent. The material is a laminate which provides even heating and can be conformed to surfaces having a variety of different contours and shapes. Operational power can be derived from low or high voltage AC or DC power supplies.

The method of the invention involves disposing the heater element on the surface of the tool die. The heater element is then energized at prescribed intervals and temperatures which are effective to heat the surface of the tool die.

Figure 1:
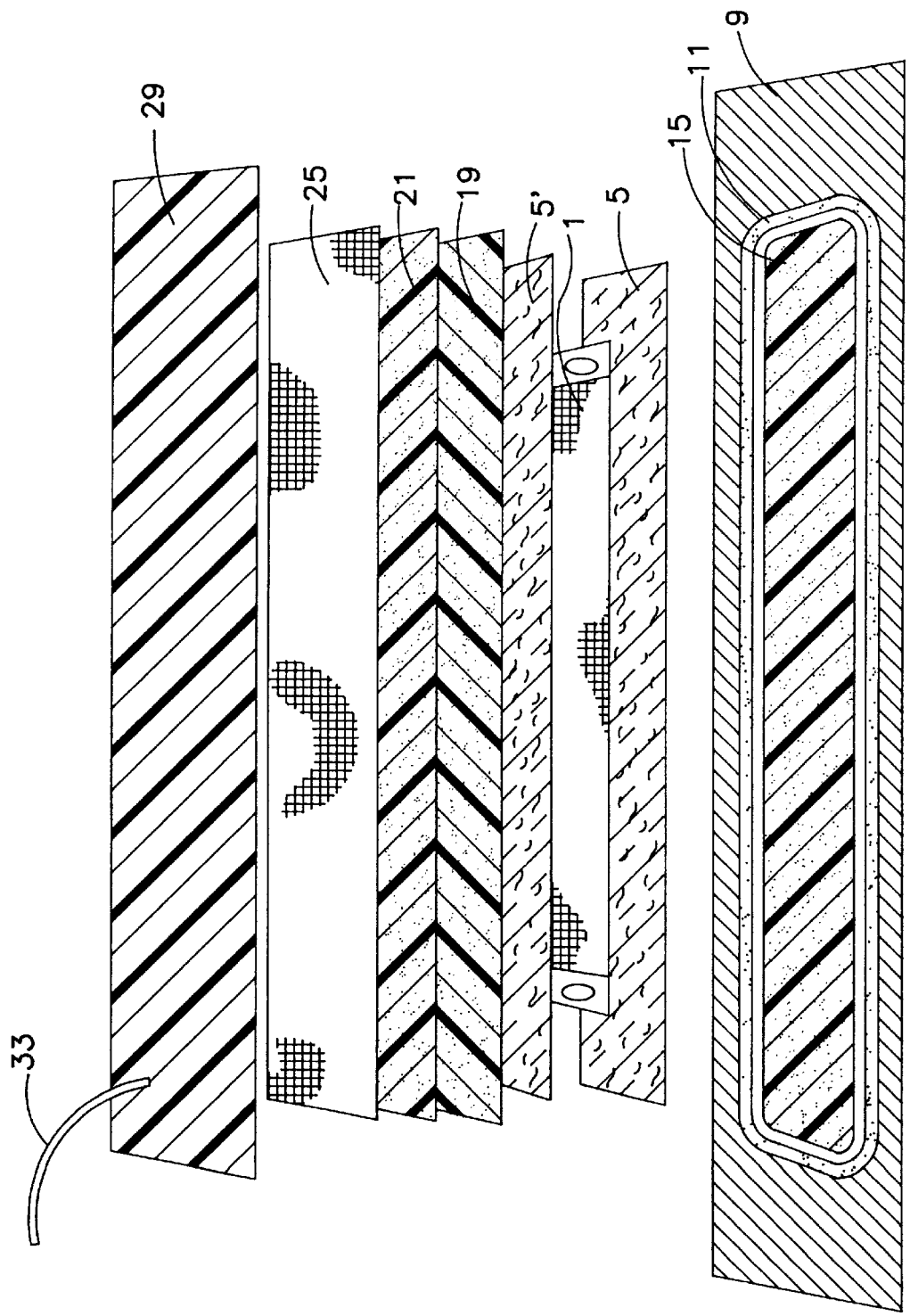
FIG. 1 depicts the construction of a composite heater element of the invention in a mold.

In one embodiment, the heater element is constructed as a pre-formed panel and is configured on a mold table for easy transfer to the final surface. As shown in FIG. 1, the pre-made panel comprises a fiberglass resin encapsulated heater element 1, further encapsulated in two fiberglass/resin cloths 5 and 5'. The heater element contains electrical leads (not shown) that extend outside of the panel and are connected to the power supply. The laminate can be constructed with one or more layers of the fiberglass resin encapsulated heater element 1. This allows an additional parameter for design of the heater output. FIG. 1 shows how a single layer pre-formed panel is constructed on a transfer table. The fiberglass resin encapsulated heater element 1 is placed on top of a mold table surface 9. A mold release wax 15 is disposed between the encapsulated heater element 1 and the table surface 9.

A peel ply 19 is placed above the encapsulated heater element 1. A release ply 21 is disposed above the peel ply 19 and a bleeder cloth 25 is disposed over the release ply 21. Finally, a vacuum bag 29 is disposed over the release ply 21. A seal tape 11 surrounding the layers on the mold is attached to the table top surface 9, and can adhere to the vacuum bag 29 to create a tight seal. A vacuum supply 33 is used to evacuate the air between the layered material in order to bring the layers into close contact with each other and cure the resin, bonding the layers to create the laminate.

In another embodiment of the invention, the heater element simply may comprise a layer of conductive fibers that are directly embedded into the tooling die material. However, in this instance, the tooling die material must posses sufficient dielectric properties to evenly distribute the heat to the surface of the die and to maintain the heat within the material.

The heater element is disposed at a predetermined location and depth in the material. The depth and location may vary according to the particular material and type of heating required as shown in FIGS. 2 and 3.

The heater element is easily formed to the tooling die or mold for even heating. Substitution of inexpensive, lighter weight heated units in place of the heavy steel devices used in autoclave forming is a possibility. These lightweight molds are easier to handle and more cost effective; allowing more flexibility in design and quantity of molds.

Figure 2:
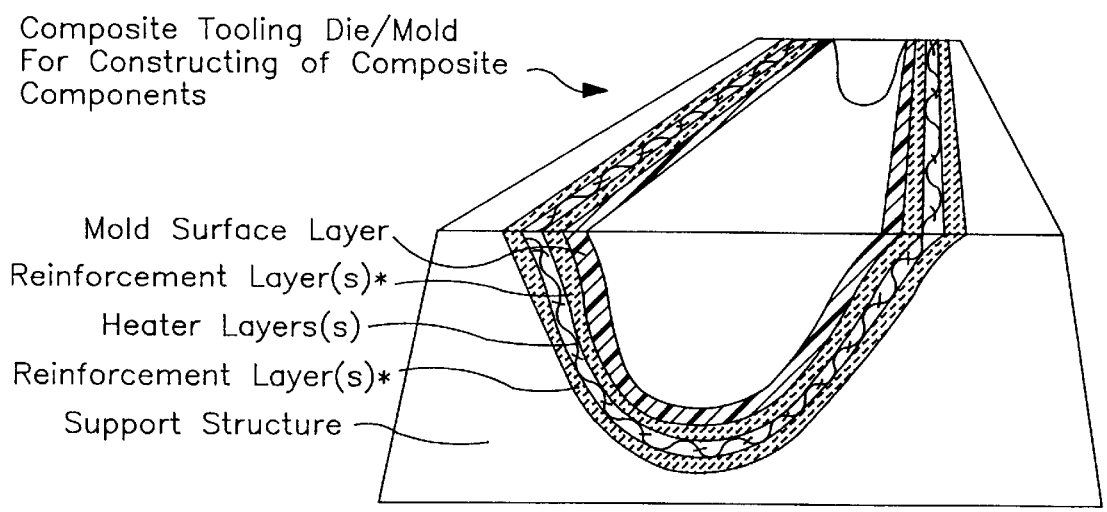
FIG. 2 is a perspective view of a tooling die of the invention.
Figure 3:
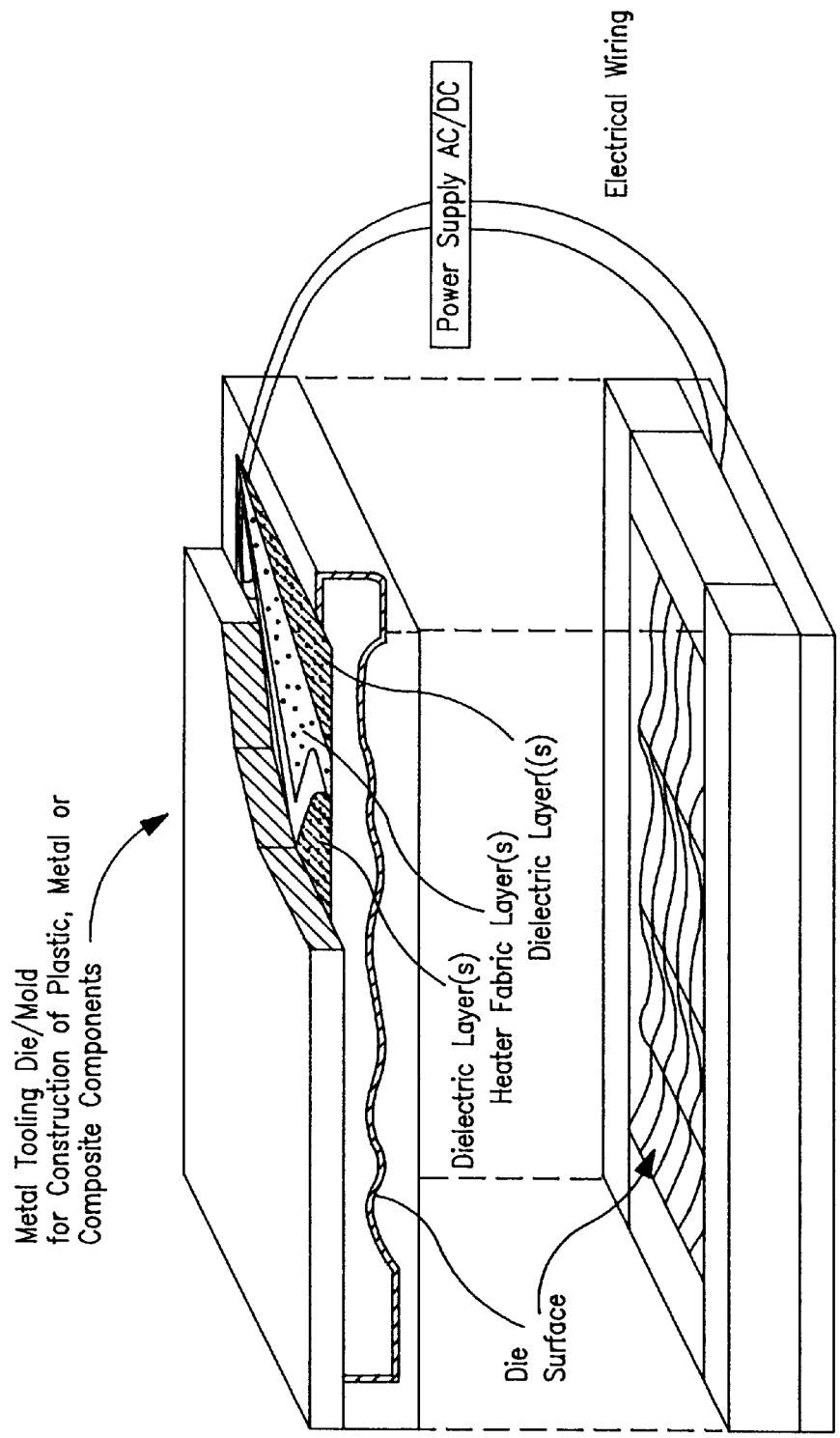
FIG. 3 is a perspective, partial cut-away view of a two-part closed tooling die of the invention.

FIGS. 2 and 3 illustrate the types of tooling dies of the invention. As seen in the figures, the heater element 1 is provided in the surface of the dies.

What is claimed is:

1. A method for heating the surface of a tooling die, comprising:

providing a pre-formed panel heater element to the tooling die; wherein said pre-formed panel heater element consists of an inner layer composed of a fabric of electrically conductive fibers encapsulated between two fiber glass/resin layer; two outer fiberglass/resin layers disposed on opposing surfaces of said inner layer and encapsulating said inner layer, and electrical leads connected to said conductive fiber and adapted to receive power from a power source;

disposing the pre-formed heater element at a predetermined location and depth from the surface of the tooting die; and energizing the conductive fibers of the fabric layer to distribute heat evenly on the surface of the tooling die.

2. The method of claim 1, wherein the pre-formed panel heater element is a laminated composite.

* * * * *